United States Patent [19]

Maeda

[11] Patent Number: 4,607,385
[45] Date of Patent: Aug. 19, 1986

[54] CHARACTER RECOGNITION APPARATUS

[75] Inventor: Ken-ichi Maeda, Kamakura, Japan

[73] Assignee: Kabushiki Kaisha Toshiba, Kawasaki, Japan

[21] Appl. No.: 613,069

[22] Filed: May 22, 1984

[30] Foreign Application Priority Data

May 25, 1983 [JP] Japan ................................ 58-91808

[51] Int. Cl.⁴ .............................................. G06K 9/34
[52] U.S. Cl. ...................................................... 382/9
[58] Field of Search .............................. 382/9, 34, 66

[56] References Cited

U.S. PATENT DOCUMENTS 3,668,638  6/1972  Iijima ..................................... 382/55
3,794,761  2/1974  Genchi et al. ......................... 358/125
4,295,121  10/1981  Enser et al. ............................. 382/9

Primary Examiner—Stephen A. Kreitman
Attorney, Agent, or Firm—Oblon, Fisher, Spivak, McClelland & Maier

[57] ABSTRACT

A character recognition apparatus has an image data generating section for storing image data corresponding to a character array on a sheet of paper and for generating a series of scan line data constituting one item of image data; a segmentation control section for generating starting and end scan line data which define a segment of each character data in accordance with the scan line data sequentially generated from the image data generating section; and a recognizing section for detecting any similarities between the reference character data and the character data generated from the data generating section in accordance with the starting and end scan line data and for generating effective data character data which has the largest similarity which is larger than a predetermined value. When none of the similarities exceed the predetermined value, the recognizing section supplies a control signal to the segmentation control section to update one item of the starting and end scan line data, thereby allowing the image data generating section to generate character data for a different segment.

19 Claims, 6 Drawing Figures

CHARACTER RECOGNITION APPARATUS

BACKGROUND OF THE INVENTION

The present invention relates to a character recognition apparatus capable of effectively recognizing characters written on a sheet of paper or the like.

Various types of character recognition techniques have been recently developed to recognize handwritten characters. In order to perform character recognition, a character image portion is detected and is selected from a relatively large observation area. The selected character image portion is then subjected to predetermined image processing so as to recognize a character written in this image portion. In general, character image detection and its subsequent selection are called segmentation. Segmentation is performed independently of character recognition processing. In addition, segmentation is performed in accordance with pitch data of a character image, the presence of a white area, an artificially plotted timing mark, and so on. For this reason, several types of restrictions are imposed when a user writes characters to be recognized on paper. Conventionally, for example, a character entry frame is printed on a sheet of paper, and the user must write characters within this frame. Therefore, when the characters are written on paper without any marking or character frames, the characters cannot be effectively recognized. There has been a demand for the development of a character recognition apparatus capable of effectively recognizing characters which are written on paper without any marking or character frames.

SUMMARY OF THE INVENTION

It is an object of the present invention to provide a character recognition apparatus for effectively recognizing characters or the like written on a sheet of paper which has neither timing marks nor character frames.

In order to achieve the above object of the present invention, there is provided a character recognition apparatus comprising a scan line data generating section for detecting at least one character on a medium, for storing image data corresponding to a detected character, and for generating a series of scan line data constituting the image data; a segmentation control section for generating starting and end scan line position data which respectively represent the starting and end scan line positions defining a segment of each character data in accordance with the series of frame data; character selecting section for causing the scan line data generating section to generate character data specified by the starting and end scan line position data supplied from the segmentation control section; and a recognizing section for recognizing a character by comparing the character data of the segment defined by the starting and end scan line position data supplied from the segmentation control section with a plurality of prestored reference character data, and for supplying a control signal to the segmentation control section and updating at least one item of the starting and end scan line position data when the character data from the scan line data generating section is detected not to coincide with any one of the reference character data.

According to the present invention, when the series of scan line data read out from the memory are not properly recognized, end scan line position data which differs from that which resulted in improper recognition is generated from the position data generating section so as to read out another series of scan line data as character data. The characters can then be more properly recognized.

DETAILED DESCRIPTION OF THE PREFERRED EMBODIMENT

Figure 1:
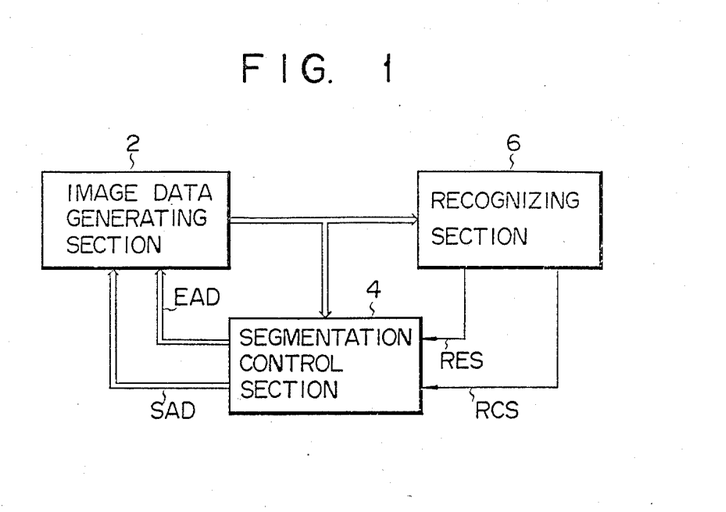
FIG. 1 is a schematic block diagram of a character recognition apparatus according to an embodiment of the present invention.

FIG. 1 is a schematic block diagram of a character recognition apparatus according to an embodiment of the present invention. The character recognition apparatus includes an image data generating section 2 for optically scanning characters written on a sheet of paper or the like and generating a series of scan line data which represent a scanned character image, a segmentation control section 4 for performing segmentation between scanned characters in accordance with the scan line data supplied from the image data generating section 2, and a recognizing section 6 for recognizing scanned characters in accordance with the scan line data supplied from the image data generating section 2. The segmentation control section 4 supplies to the image data generating section 2 starting and end address data SAD and EAD which respectively specify starting and end scan line positions of each of the scanned characters. The recognizing section 6 processes the image data supplied from the image data generating section 2 and supplies a recognition end signal RES or a resegmentation command signal RCS to the segmentation control section 4 in accordance with the image processing result.

Figure 2:
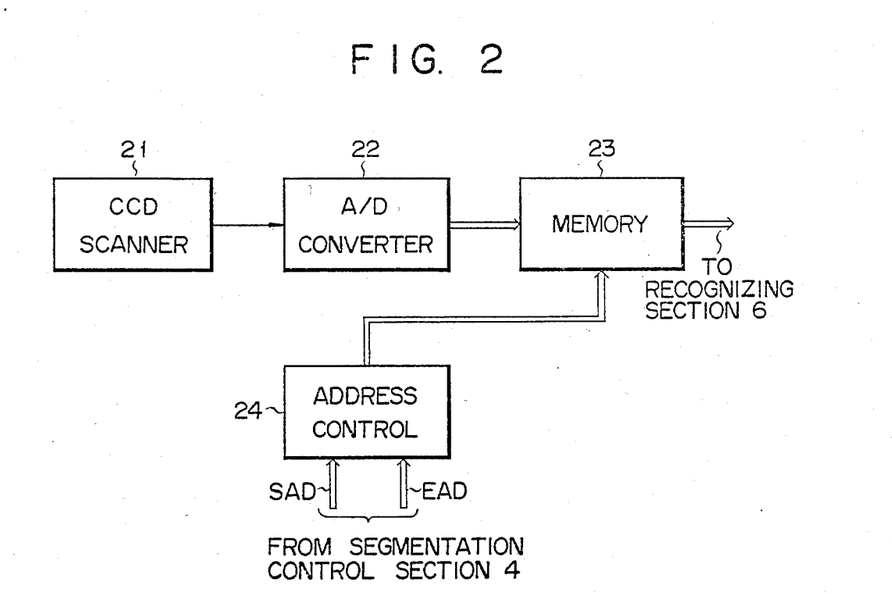
FIG. 2 is a block diagram of an image data generating section shown in FIG. 1.

FIG. 2 is a block diagram of the image data generating section 2. The image data generating section 2 includes a CCD scanner 21 for scanning characters written on the sheet and generating electrical signals corresponding to the scanned character, an A/D converter 22 for converting to a digital signal an output signal which is generated from the CCD scanner 21, a memory 23 for storing data supplied from the A/D converter 22, and an address control 24 for reading out data from the memory 23 in response to the address data SAD and EAD generated from the segmentation control section 4.

In this embodiment, the CCD scanner 21 supplies a scan line signal to the A/D converter 22 every time the scanner 21 scans the characters in a direction perpendicular to the character array. The CCD scanner 21 scans each character array M times while performing one sub-scanning operation in a direction along the character array, and sequentially supplies M scan line signals to the A/D converter 22. In response to the scan line signals from the CCD scanner 21, the A/D converter 22 supplies to the memory 23 N-bit scan line data which represents the bright/dark states of the scanned line area. Therefore, the memory 23 sequentially stores M scan line data each of which includes N bits.

Figure 3:
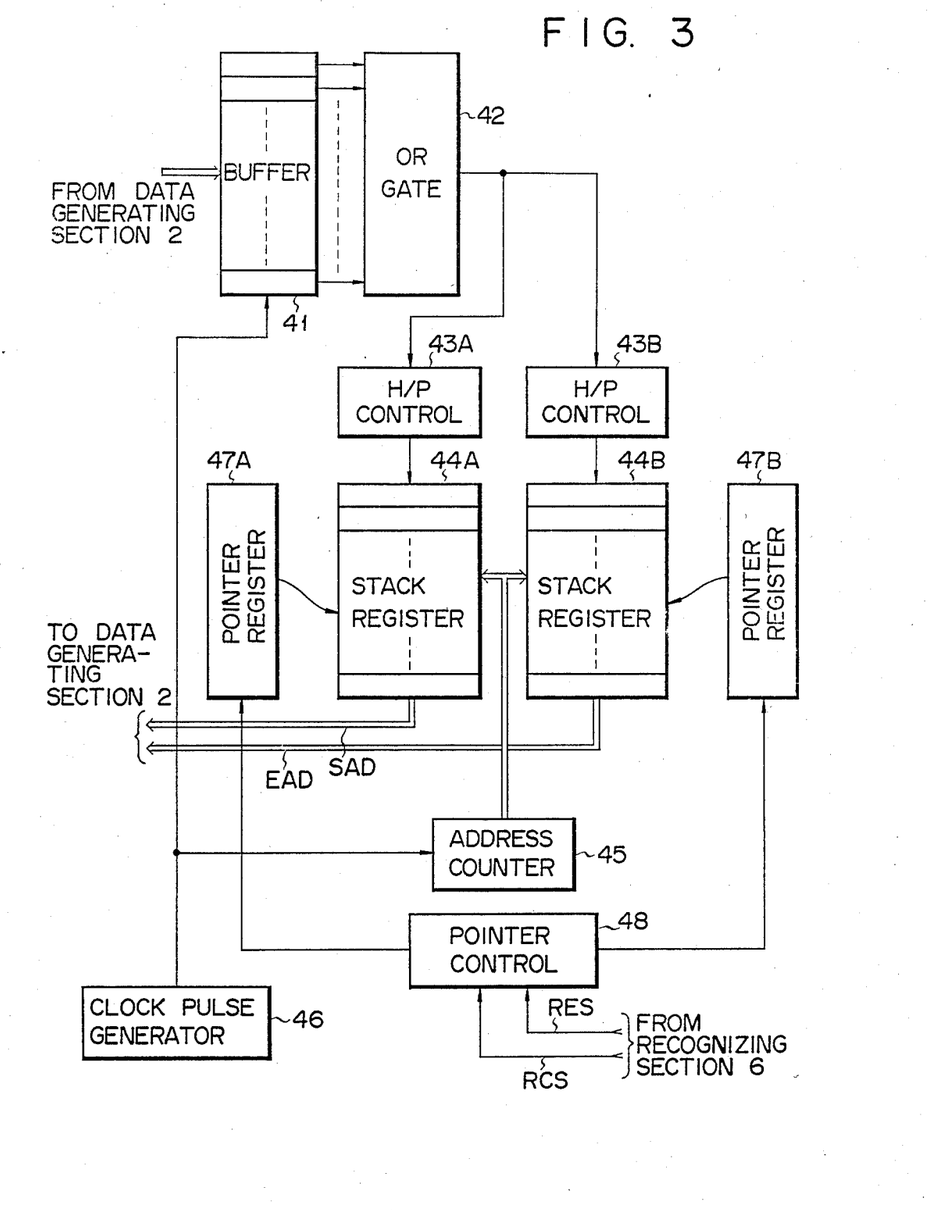
FIG. 3 is a block diagram of a segmentation control section shown in FIG. 1.

FIG. 3 is a block diagram of the segmentation control section 4. The segmentation control section 4 includes an N-stage scan line buffer 41 for receiving N-bit scan line data supplied from the image data generating section 2, an OR gate 42 for receiving N output bits from the scan line buffer 41, push/pop (H/P) controls 43A and 43B for generating output signals in response to the leading and trailing edges of the output signal supplied through the OR gate 42, respectively, and address stack registers 44A and 44B for storing address data in an address counter 45 in response to the output signals generated from the H/P controls 43A and 43B. The address counter 45 counts clock pulses generated from a clock pulse generator 46 which are also supplied to the scan line buffer 41 to cause it to receive the scan line data generated from the image data generating section 2. The segmentation control section 4 further includes pointer registers 47A and 47B for storing pointer data which point the readout stages of the stack registers 44A and 44B, and a pointer control 48 for updating the contents of the pointer registers 47A and 47B in response to the signals RES and RCS generated from the recognizing section 6.

For example, when N bits of the scan line data from the image data generating section 2 are all set at "0" which represents a white area, the OR gate 42 generates a low level signal representing that this scan line data specifies a noncharacter area. However, when the scan line data from the image data generating section 2 includes at least one bit of logic "1" which represents a black area, the OR gate 42 generates a high level signal representing that the scan line data specifies a character area. When the output signal from the OR gate 42 becomes high (i.e., when a starting point of a character or the like is detected), the H/P control 43A supplies a write command signal to the stack register 44A to cause it to receive the contents of the address counter 45 as the starting address data. When the output signal from the OR gate 42 becomes low (i.e., when the end point of a character or the like is detected), the H/P control 43B supplies a write command signal to the stack register 44B to cause the stack register 44B to receive the contents of the address counter 45 as the end address data. In this manner, the stack registers 44A and 44B sequentially receive the starting and end address data.

Figure 4:
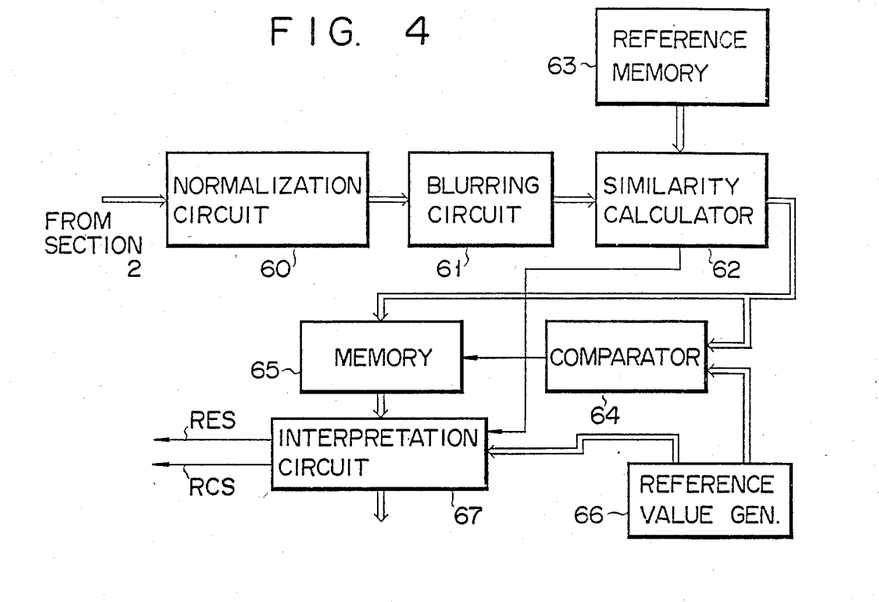
FIG. 4 is a block diagram of a recognizing section shown in FIG. 1.

FIG. 4 is a block diagram of the recognizing section 6. The recognizing section 6 includes a normalization circuit 60 for normalizing image data constituted by a plurality of scan line data which are generated from the image data generating section 2 and which are detected by the signals SAD and EAD generated from the segmentation control circuit 4, a blurring circuit 61 for blurring the image data generated from the normalization circuit 60, and a similarity calculator 62 for sequentially calculating the similarity between the image data generated from the blurring circuit 61 and the corresponding reference image data stored in a reference memory 63, and for generating similarity data. The similarity data from the similarity calculator 62 is sequentially supplied to a comparator 64 and a memory 65. When the comparator 64 detects that the similarity data from the similarity calculator 62 is larger than a first reference value RV1 from a reference value generator 66, the comparator 64 supplies a write command signal to the memory 65 which then stores the image data and similarity data supplied from the similarity calculator 62. The similarity calculator 62 supplies an end signal to an interpretation circuit 67 when the calculator 62 completes the calculation of similarity between each image data generated from the blurring circuit 61 and all reference image data read out from the reference memory 63. The interpretation circuit 67 extracts the largest and second largest similarity data from the memory 65 in response to the end signal generated from the similarity calculator 62 and compares the difference between the largest and second largest similarity data with a second reference value RV2 generated from the reference value generator 66. When the interpretation circuit 67 detects that the difference is larger than the second reference value RV2, the circuit 67 generates a recognition end signal RES and image data having the largest similarity as effective image data. On the other hand, when all similarity data from the similarity calculator 62 are smaller than the first reference value, the interpretation circuit 67 generates the resegmentation command signal RCS.

The operation of the character recognition apparatus shown in FIGS. 1 to 4 will now be described.

In the image data extracting mode, M scan line data which represent a single character array and each of which includes N bits are sequentially written in the memory 23, as previously described. When all the scan line data are written in the memory 23, the address control 24 sequentially specifies addresses from the first scan line to the Mth scan line, so that the scan line data are sequentially read out from the memory 23. The readout data are sequentially supplied to the scan line buffer 41 in the segmentation control section 4. When the memory 23 is set in a read mode by an external control circuit (not shown), the address counter 45 is reset. Thereafter, the address control 24 supplies the address signal to the memory 23 so as to read out the scan line data therefrom in response to the clock pulse generated from the clock pulse generator 46.

When at least one of the N bits (all "0") of the scan line data supplied to the scan line buffer 41 goes from logic "0" to "1", a high level signal is generated from the OR gate 42. In response to rising of the output signal from the OR gate 42, the H/P control 43A supplies a write command signal to the stack register 44A which then stores the contents of the address counter 45 as starting address data. Subsequently, when the N bits of the scan line data supplied to the buffer 41 are all set at "0", the output signal from the OR gate 42 becomes low. In response to the fall of the output signal from the OR gate 42, the H/P control 43B supplies the write command signal to the stack register 44B which then stores the contents of the address counter 45 as end address data. In this manner, every time the output signal from the OR gate 42 becomes high, the contents of the address counter 45 is stored as the starting address data in the stack register 44A. On the other hand, every time the output signal from the OR gate 42 becomes low, the contents of the address counter 45 is stored in the stack register 44B as the end address data. This operation continues until the Mth scan line data (i.e., last scan line data) is read out from the memory 23. Thereafter, in response to a control signal from an external control circuit (not shown), the clock pulse generator 46 is reset and the pointer control 48 is set in the initial state. At the same time, the similarity calculator 62 is rendered active, thereby setting the apparatus in the segmentation/recognition mode.

When the pointer control 48 is set in the initial state, it supplies "point 1" data to both the pointer registers 47A and 47B which then store the "point 1" data therein, thereby accessing the first stages of the stack registers 44A and 44B. The first starting and first end address data SAD and EAD are supplied from the stack registers 44A and 44B to the address control 24. In response to the first starting and first end address data, the address control 24 sequentially supplies to the memory 23 the address data from the first starting address data to the first end address data, so that the corresponding scan line data are sequentially supplied from the memory 23 to the normalization circuit 60. The normalization circuit 60 normalizes the character data constituted by the plurality of frame data supplied from the memory 23 in accordance with a known technique so as to convert it to character data representing a character of a predetermined size. The character data from the normalization circuit 60 is subjected to predetermined blurring in the blurring circuit 61 in accordance with the known technique disclosed in, for example, U.S. Pat. No. 3,668,638. The blurred data is supplied to the similarity calculator 62. The similarity calculator 62 sequentially calculates the similarity between the character data generated from the blurring circuit 61 and the reference image data read out from the reference memory 63 in accordance with multiple similarities disclosed in, for example, U.S. Pat. No. 3,688,267. When the obtained similarities are larger than the first reference value RV1, these similarities and the corresponding character data are stored in the memory 65. When the interpretation circuit 67 detects that only a single item of similarity data has been stored, the interpretation circuit 67 reads out the character data as the effective data from the memory 65. At the same time, the interpretation circuit 67 generates the recognition end signal RES. On the other hand, when a plurality of similarity data are stored in the memory 65, the interpretation circuit 67 detects whether or not the difference between the largest and second largest similarity data is larger than the second reference value RV2. When the circuit 67 determines that the difference is equal to or larger than RV2, the circuit 67 generates as the effective data the character data which corresponds to the largest similarity data. At the same time, the circuit 67 generates the recognition end signal RES. However, when the circuit 67 determines that the difference is smaller than RV2, the circuit 67 does not generate the effective data but the recognition end signal. When the interpretation circuit 67 determines that no similarity data has been stored in the memory 65, the circuit 67 generates the resegmentation command signal RCS.

In response to the resegmentation command signal RCS generated from the interpretation circuit 67, the pointer control 48 increases the contents of the pointer register 47B by one without updating the contents of the pointer register 47A when the pointer control 48 detects that the contents of the pointer register 47A are the same as those of the pointer register 47B. When the pointer control 48 detects that the contents of the pointer register 47B is larger than that of the pointer register 47A, the pointer control 48 increases the contents of the pointer register 47A by one in response to the resegmentation command signal RCS generated from the interpretation circuit 67. In addition, the pointer control 48 increases the contents of the pointer register 47B in response to the recognition end signal RES generated from the interpretation circuit 67, and causes the same contents as in the pointer register 47B to be stored in the pointer register 47A.

When the resegmentation command signal RCS is generated from the interpretation circuit 67 while the "point 1" data is stored in both the pointer registers 47A and 47B, the contents of the pointer register 47A is held to be "point 1" data, while the contents of the pointer register 47B is increased by one and becomes "point 2" data, thereby using as segmentation data the first start address data and the second end address data. Thereafter, when the resegmentation command signal RCS is generated from the interpretation circuit 67, the contents of the pointer register 47A are increased by one, while the contents of the pointer register 47B are held to be "point 2" data. Therefore, the contents of the pointer register 47A is updated to be "point 2" data. Then, the second starting and second end address data are used as segmentation data. In addition, when the recognition end signal RES is generated from the interpretation circuit 67 while the "point 1" data and the "point 2" data are respectively stored in the pointer registers 47A and 47B, the pointer control 48 updates the contents of the pointer register 47B from the "point 2" data to "point 3" data, and at the same time, updates the contents of the pointer register 47A from the "point 1" data to "point 3" data. In this manner, the third starting and third end address data are used as segmentation data.

The plurality of scan line data at addresses accessed by the start and end address data SAD and EAD generated from the segmentation control section 4 are read out from the memory 23. The recognition section 6 performs recognition processing of the character data constituted by the plurality of scan line data read out from the memory 23. The address data SAD and EAD are updated in accordance with the recognition processing result. A plurality of frame data at the addresses accessed by the updated address data are read out as character data and are supplied to the recognition section 6.

In the embodiment described above, when the character data between the first starting scan line and the first end scan line are not properly recognized, the character data between the first starting scan line and the second end scan line are recognized. In this manner, highly precise segmentation can be performed to effectively recognize the characters.

Figure 5:
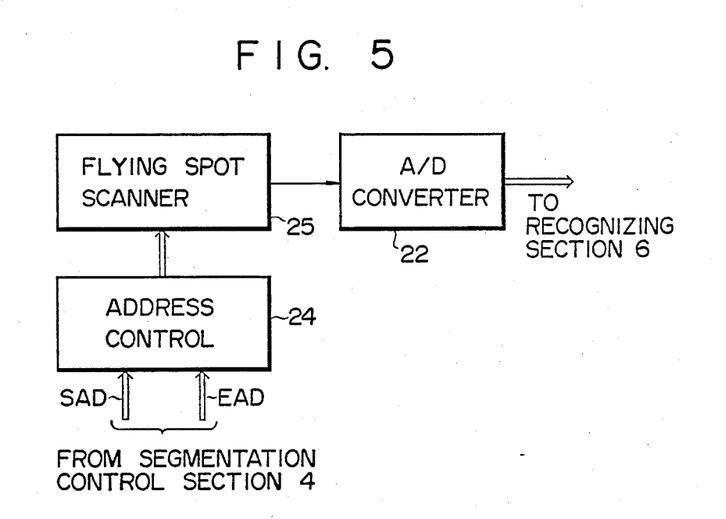
FIG. 5 is a block diagram showing a modification of the image data generating section shown in FIG. 2.

The present invention exemplified by the embodiment described above is not limited to this particular embodiment. For example, a flying spot scanner 25 shown in FIG. 5 can be used in place of the CCD scanner 21 in the image data generating section 2 shown in FIG. 2. In this case, the memory 23 can be omitted. The address control 24 selectively specifies the address positions in the flying spot scanner 25 in response to the address data SAD and EAD generated from the control section 4.

Figure 6:
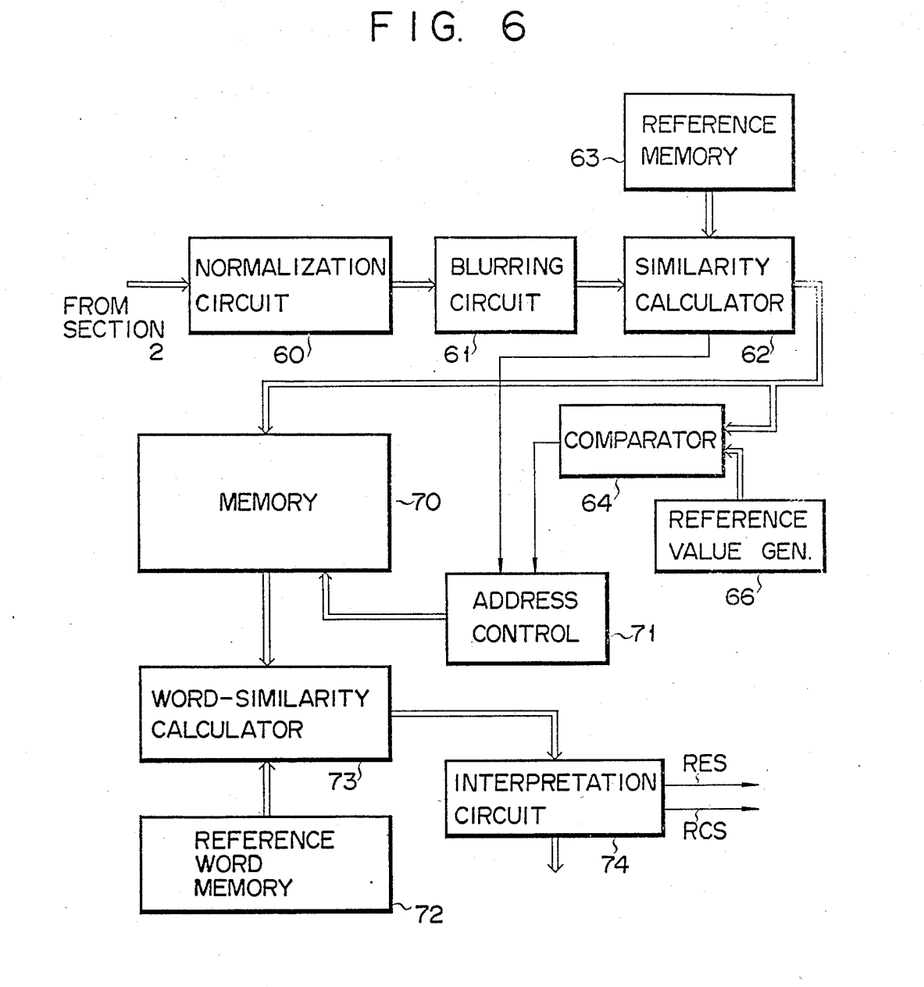
FIG. 6 is a block diagram showing a modification of the recognizing section shown in FIG. 4.

An arrangement shown in FIG. 6 can be used in place of the recognizing section 6 shown in FIG. 4. This recognizing section has a memory 70, a read/write address control 71, a reference word memory 72, a word-similarity calculator 73 and an interpretation circuit 74, instead of the memory 65 and the interpretation circuit 67 in FIG. 4.

The address control 71 sequentially specifies memory blocks of the memory 70 in response to the end signal generated from the similarity calculator 62. The address control 71 responds to the output signal generated from the comparator 64 to sequentially store in the memory blocks the character and similarity data generated from the similarity calculator 62. As a result, at least one character data obtained from each character segment is stored in a corresponding one of the memory blocks of the memory 70.

The address control 71 reads out from each memory block single character data in an order from the larger similarity data to the smaller one. Word data each constituted by a series of readout character data are sequentially supplied to the word-similarity calculator 73. The word-similarity calculator 73 calculates similarity between the word data read out from the memory 70 and the reference word data read out from the memory 72, and supplies the similarity data and the corresponding word data to the interpretation circuit 74. When the similarity data from the word-similarity calculator 73 is larger than a predetermined value, the interpretation circuit 74 generates the corresponding word data as the effective data. At this time, the interpretation circuit 74 also generates the recognition end signal RES. However, when the similarity data does not exceed the predetermined value, the interpretation circuit 74 generates the resegmentation command signal RCS.

In the embodiment shown in FIGS. 1 to 4, when the character data between the first starting scan line and the second end scan line are not properly recognized, the character data between the second starting scan line and the second end scan line are recognized. However, in this case, the character data between the first starting scan line and the third end scan line may be recognized.

Furthermore, in the above embodiment, the character data of one array are stored in the memory 23. However, image data of a predetermined number scan lines may be stored in the memory 23, and segmentation and recognition may be performed in accordance with the image data of the predetermined number of scan lines.

Furthermore, in the above embodiment, the OR gate 42 generates a high level signal when at least one of the N bits of data in the buffer 41 is set at logic "1". However, an adder for adding a "1" bit of data in the buffer 41 and a comparator can be used in place of the OR gate 42. In this case, when a predetermined number of "1"-bit signals are set in the buffer 41, the comparator generates a high level signal.

The character data having the highest similarity data stored in the memory 65 in FIG. 4 may be always read out as effective data.

Furthermore, the similarity data are used for character recognition in the recognizing section 6. However, another measure such as distance data may be used in place of the similarity data.

What is claimed is:

1. A character recognition apparatus comprising:
    scan line data generating means for detecting at least one character on a medium, storing image data corresponding to a detected character, and generating a series of scan line data constituting the image data;
    segmentation control means for generating starting and end scan line position data which respectively represent starting and end scan line positions for defining a segment of each character data in accordance with the series of scan line data;
    character selecting means for generating from said scan line data generating means the character data specified in accordance with the starting and end scan line position data generated from said segmentation control means; and
    recognizing means for recognizing characters by comparing the character data of the segment defined by the starting and end scan line position data generated from said segmentation control means with a plurality of prestored reference character data, and for supplying a control signal to said segmentation control means to update at least one of the starting and end scan line position data when the character data from said scan line data generating means does not coincide with any of the reference character data.

2. An apparatus according to claim 1, wherein said scan line data generating means comprises a charge-coupled device scanner for optically detecting characters, an analog-to-digital converter for converting to a digital signal an output signal generated from said charge-coupled device scanner, and a memory for storing the digital signal generated from said analog-to-digital converter.

3. An apparatus according to claim 2, wherein said segmentation control means comprises a boundary signal generating circuit for receiving each of the scan line data generated from said scan line data genearting means and generating a first signal which represents a change from a noncharacter area to a character area and a second signal which represents a change from the character area to the noncharacter area in accordance with the received scan line data, a counting circuit for counting the scan line data supplied from said scan line data generating means to said boundary signal generating circuit, first and second data storing means for respectively storing as the starting and end scan line position data contents of said counting circuit in response to the first and second signals generated from said boundary signal generating circuit, and readout control means, reponsive to the control signal generated from said recognizing means, for updating at least one of read address signals supplied to said first and second data storing means to update at least one of the starting and end scan line position data from said first and second data storing means, and supplying updated starting and end scan line position data to said character selecting means.

4. An apparatus according to claim 3, wherein said recognizing means comprises a data generator for generating similarity data corresponding to similarities between a plurality of prestored reference character data and character data generated from said scan line data generating means in accordance with the starting and end scan line position data, a memory for storing similarity data whose similarities exceed a predetermined value, and an interpretation circuit for generating as effective character data the character data associated with largest similarity data stored in said memory and for generating the control signal when said interpretation circuit detects that none of similarity data exceeding the predetermined value is stored in said memory.

5. An apparatus according to claim 4, wherein said data generator comprises a normalization circuit for normalizing the character data generated from said scan line data generating means, a blurring circuit for blurring the character data generated from said normalization circuit, a reference memory for storing the plurality of prestored reference character data, and a similarity calculator for calculating a similarity between the character data generated from said blurring circuit and the reference character data read out from said reference memory.

6. An apparatus according to claim 3, wherein said recognizing means comprises a data generator for generating similarity data corresponding to similarities between a plurality of prestored reference character data and character data generated from said scan line data generating means in accordance with the starting and end scan line position data, a memory for storing similarity data whose similarities exceed a predetermined value, a word-similarity calculator for calculating a word-similarity corresponding to similarities between word data constituted by the character data of a series of segments stored in said memory and a plurality of prestored reference word data, and an interpretation circuit for generating as effective data the word data associated with largest word-similarity data generated from said word-similarity calculator.

7. An apparatus according to claim 6, wherein said data generator comprises a normalization circuit for normalizing the character data generated from said scan line data generating means, a blurring circuit for blurring the character data generated from said normalization circuit, a reference memory for storing the plurality of prestored reference character data, and a similarity calculator for calculating a similarity between the character data generated from said blurring circuit and the reference character data read out from said reference memory.

8. An apparatus according to claim 2, wherein said recognizing means comprises a data generator for generating similarity data corresponding to similarities between a plurality of prestored reference character data and character data generated from said scan line data generating means in accordance with the starting and end scan line position data, a memory for storing similarity data whose similarities exceed a predetermined value, and an interpretation circuit for generating as effective character data the character data associated with largest similarity data stored in said memory and for generating the control signal when said interpretation circuit detects that none of similarity data exceeding the predetermined value is stored in said memory.

9. An apparatus according to claim 2, wherein said recognizing means comprises a data generator for generating similarity data corresponding to similarities between a plurality of prestored reference character data and character data generated from said scan line data generating means in accordance with the starting and end scan line position data, a memory for storing similarity data whose similarities exceed a predetermined value, a word-similarity calculator for calculating a word-similarity corresponding to similarities between word data constituted by the character data of a series of segments stored in said memory and a plurality of prestored reference word data, and an interpretation circuit for generating as effective data the word data associated with largest word-similarity data generated from said word-similarity calculator.

10. An apparatus according to claim 1, wherein said scan line data generating means comprises a flying spot scanner for optically detecting characters and storing detected character data, and an analog-to-digital converter for converting to a digital signal an output signal generated from said flying spot scanner.

11. An apparatus according to claim 10, wherein said segmentation control means comprises a boundary signal generating circuit for receiving each of the scan line data generated from said scan line data genearting means and generating a first signal which represents a change from a noncharacter area to a character area and a second signal which represents a change from the character area to the noncharacter area in accordance with the received scan line data, a counting circuit for counting the scan line data supplied from said scan line data generating means to said boundary signal generating circuit, first and second data storing means for respectively storing as the starting and end scan line position data contents of said counting circuit in response to the first and second signals generated from said boundary signal generating circuit, and readout control means, reponsive to the control signal generated from said recognizing means, for updating at least one of read address signals supplied to said first and second data storing means to update at least one of the starting and end scan line position data from said first and second data storing means, and supplying updated starting and end scan line position data to said character selecting means.

12. An apparatus according to claim 11, wherein said recognizing means comprises a data generator for generating similarity data corresponding to similarities between a plurality of prestored reference character data and character data generated from said scan line data generating means in accordance with the starting and end scan line position data, a memory for storing similarity data whose similarities exceed a predetermined value, and an interpretation circuit for generating as effective character data the character data associated with largest similarity data stored in said memory and for generating the control signal when said interpretation circuit detects that none of similarity data exceeding the predetermined value is stored in said memory.

13. An apparatus according to claim 11, wherein said recognizing means comprises a data generator for generating similarity data corresponding to similarities between a plurality of prestored reference character data and character data generated from said scan line data generating means in accordance with the starting and end scan line position data, a memory for storing similarity data whose similarities exceed a predetermined value, a word-similarity calculator for calculating a word-similarity corresponding to similarities between word data constituted by the character data of a series of segments stored in said memory and a plurality of prestored reference word data, and an interpretation circuit for generating as effective data the word data associated with largest word-similarity data generated from said word-similarity calculator.

14. An apparatus according to claim 10, wherein said recognizing means comprises a data generator for generating similarity data corresponding to similarities between a plurality of prestored reference character data and character data generated from said scan line data generating means in accordance with the starting and end scan line position data, a memory for storing similarity data whose similarities exceed a predetermined value, and an interpretation circuit for generating as effective character data the character data associated with largest similarity data stored in said memory and for generating the control signal when said interpretation circuit detects that none of similarity data exceeding the predetermined value is stored in said memory.

15. An apparatus according to claim 10, wherein said recognizing means comprises a data generator for generating similarity data corresponding to similarities between a plurality of prestored reference character data and character data generated from said scan line data generating means in accordance with the starting and end scan line position data, a memory for storing similarity data whose similarities exceed a predetermined value, a word-similarity calculator for calculating a word-similarity corresponding to similarities between word data constituted by the character data of a series of segments stored in said memory and a plurality of prestored reference word data, and an interpretation circuit for generating as effective data the word data associated with largest word-similarity data generated from said word-similarity calculator.

16. An apparatus according to claim 1, wherein said segmentation control means comprises a boundary signal generating circuit for receiving each of the scan line data generated from said scan line data genearting means and generating a first signal which represents a change from a noncharacter area to a character area and a second signal which represents a change from the character area to the noncharacter area in accordance with the received scan line data, a counting circuit for counting the scan line data supplied from said scan line data generating means to said boundary signal generating circuit, first and second data storing means for respectively storing as the starting and end scan line position data contents of said counting circuit in response to the first and second signals generated from said boundary signal generating circuit, and readout control means, reponsive to the control signal generated from said recognizing means, for updating at least one of read address signals supplied to said first and second data storing means to update at least one of the starting and end scan line position data from said first and second data storing means, and supplying updated starting and end scan line position data to said character selecting means.

17. An apparatus according to claim 16, wherein said recognizing means comprises a data generator for generating similarity data corresponding to similarities between a plurality of prestored reference character data and character data generated from said scan line data generating means in accordance with the starting and end scan line position data, a memory for storing similarity data whose similarities exceed a predetermined value, and an interpretation circuit for generating as effective character data the character data associated with largest similarity data stored in said memory and for generating the control signal when said interpretation circuit detects that none of similarity data exceeding the predetermined value is stored in said memory.

18. An apparatus according to claim 1, wherein said recognizing means comprises a data generator for generating similarity data corresponding to similarities between a plurality of prestored reference character data and character data generated from said scan line data generating means in accordance with the starting and end scan line position data, a memory for storing similarity data whose similarities exceed a predetermined value, and an interpretation circuit for generating as effective character data the character data associated with largest similarity data stored in said memory and for generating the control signal when said interpretation circuit detects that none of similarity data exceeding the predetermined value is stored in said memory.

19. An apparatus according to claim 1, wherein said recognizing means comprises a data generator for generating similarity data corresponding to similarities between a plurality of prestored reference character data and character data generated from said scan line data generating means in accordance with the starting and end scan line position data, a memory for storing similarity data whose similarities exceed a predetermined value, a word-similarity calculator for calculating a word-similarity corresponding to similarities between word data constituted by the character data of a series of segments stored in said memory and a plurality of prestored reference word data, and an interpretation circuit for generating as effective data the word data associated with largest word-similarity data generated from said word-similarity calculator.

* * * * *